United States Patent
Takahashi

(10) Patent No.: US 11,427,479 B2
(45) Date of Patent: *Aug. 30, 2022

(54) HIGH PURITY TUNGSTEN PENTACHLORIDE AND PRODUCTION METHOD THEREOF

(71) Applicant: JX Nippon Mining & Metals Corporation, Tokyo (JP)

(72) Inventor: Hideyuki Takahashi, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/338,020

(22) PCT Filed: Oct. 6, 2017

(86) PCT No.: PCT/JP2017/036406
§ 371 (c)(1),
(2) Date: Mar. 29, 2019

(87) PCT Pub. No.: WO2018/105220
PCT Pub. Date: Jun. 14, 2018

(65) Prior Publication Data
US 2019/0233301 A1    Aug. 1, 2019

(30) Foreign Application Priority Data

Dec. 5, 2016   (JP) .............................. JP2016-235846

(51) Int. Cl.
*C01G 41/04*       (2006.01)
(52) U.S. Cl.
CPC .................... *C01G 41/04* (2013.01)
(58) Field of Classification Search
CPC ..................................................... C01G 41/04
See application file for complete search history.

(56) References Cited

U.S. PATENT DOCUMENTS 9,536,782 B2    1/2017 Hotta et al.
9,595,470 B2    3/2017 Bamnolker et al.
(Continued)

OTHER PUBLICATIONS

Brown, Theodore Martin, "Preparation and reactions of some lower tungsten halides and halide complexes", 1963, Retrospective Theses and Dissertation, 2522, pp. 1-27. (Year: 1963).*

(Continued)

*Primary Examiner* — Ngoc-Yen Nguyen
(74) *Attorney, Agent, or Firm* — Howson & Howson LLP

(57) ABSTRACT

Provided are high purity tungsten pentachloride, and a method for obtaining such high purity tungsten pentachloride at a high yield and in an efficient manner. Tungsten pentachloride in which a total content of metal impurities excluding Sb, Ti, and As is less than 10 wtppm is obtained by uniformly mixing one or more types of reducing agents selected from Sb, Ti, and As and tungsten hexachloride at a molar ratio of 1.0:2.0 to 1.0:5.0 (reducing agent/$WCl_6$ ratio) in an inert atmosphere to obtain a mixture, heating and reducing the mixture for 1 to 100 hours in a temperature range in which a chloride of tungsten and the reducing agent becomes a liquid phase to obtain a reduced product, heating the reduced product for 1 to 100 hours at 100 Pa or less and in a temperature range of 90 to 130° C., and performing reduced-pressure distillation thereto to obtain a reduced-pressure distilled product, heating and sublimating the reduced-pressure distilled product for 1 to 100 hours at 100 Pa or less and in a temperature range of 130 to 170° C., and performing sublimation purification of achieving precipitation at 70 to 120° C.

7 Claims, 1 Drawing Sheet

(56) References Cited

U.S. PATENT DOCUMENTS

| | | | |
|---|---|---|---|
| 2016/0046408 A1* | 2/2016 | Girard | C23C 16/045 |
| | | | 206/524.2 |
| 2016/0305020 A1* | 10/2016 | Wu | B01D 3/346 |
| 2019/0031526 A1 | 1/2019 | Takahashi et al. | |

OTHER PUBLICATIONS

Kolesnichenko et al,"Facile Reduction of Tungsten Halides with Nonconventional, Mild Reductants. I.Tungsten Tetrachloride: Several Convenient Solid-State Synthesis, a Solution Synthesis of Highly Reactive (WCl4)x, and the Molecular Structure of Polymeric Tungsten Tetrachloride", Ing. Chem. 37, 3257-62 (Year: 1998).*

T.M. Brown, "Preparation and Reactions of Some Lower Tungsten Halides and Halide Complexes", Iowa State University Digital Repository, pp. 1-3, 25-27, 1963 (month unknown).

Takashi Takuma et al., "Thermodynamic Properties of Tungsten Hexachloride and Tungsten Pentachloride", Journal of the Chemical Society of Japan, No. 5, pp. 865-873, 1972 (month unknown) (see English Abstract on p. 873).

V. Kolesnichenko et al., "Facile Reduction of Tungsten Halides with Nonconventional, Mild Reductants. I. Tungsten Tetrachloride: Several Convenient Solid-State Syntheses, a Solution Synthesis of Highly Reactive (WCI4)x, and the Molecular Structure of Polymeric Tungsten Tetrachloride", Inorg. Chem, vol. 37, No. 13, May 1998 (Abstract only).

McCann, E.L. et al., "29. Tungsten (V) Chloride", Inorganic Syntheses, vol. 13, p. 150-154, 1972 (month unknown).

Brown, T.M. et al., "An Improve Method for the Preparation of Tungsten Pentachloride and MolybdenumTetrachloride", Inorganic Chemistry, vol. 7, No. 06, pp. 1227-1229, Jun. 1968.

Thorn-Csanyi, E. et al., "A New Route to the Preparation of Tungsten Pentachloride", Journal of Molecular Catalysis, vol. 65, p. 261-267, 1991 (month unknown).

* cited by examiner

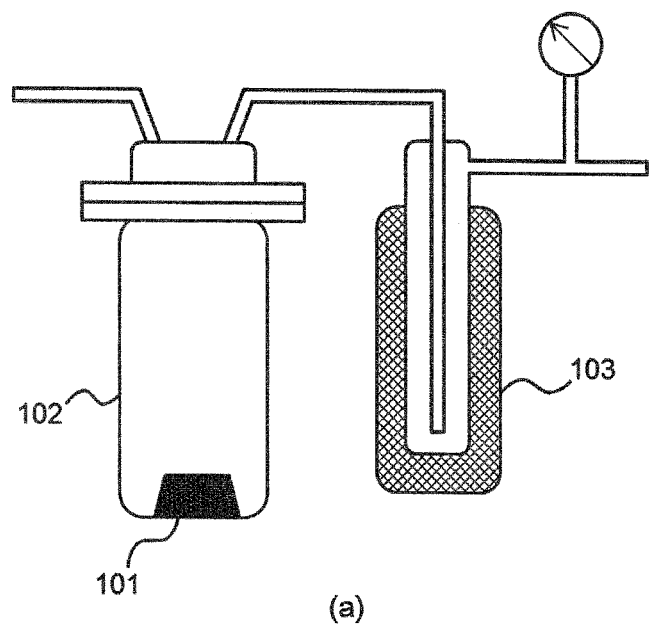
(a)
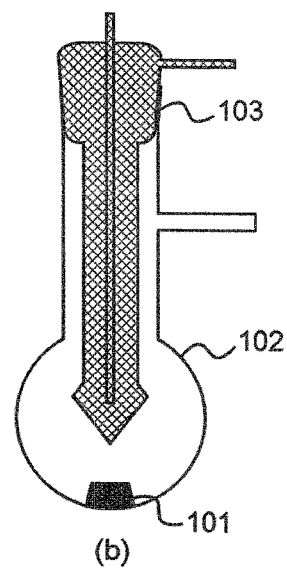
(b)
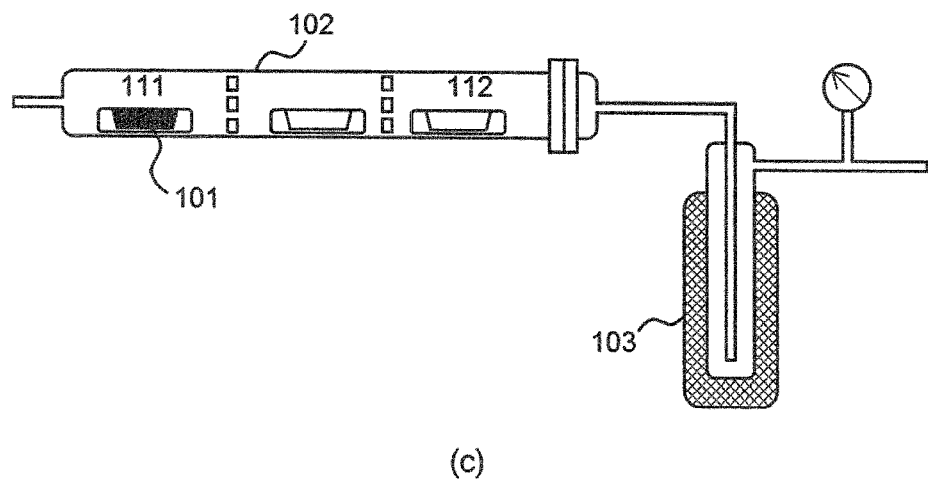
(c)

HIGH PURITY TUNGSTEN PENTACHLORIDE AND PRODUCTION METHOD THEREOF

BACKGROUND

The present invention relates to high purity tungsten pentachloride and a production method thereof suitable for electronic devices such as semiconductor devices and a production process thereof, functional chemical catalysts, and compound synthetic raw materials.

Since metallic tungsten (W) has electrically low resistivity (roughly 5 to 6 $\mu\Omega\cdot cm$) and has a characteristic of little electro migration, and is also relatively stable chemically, tungsten has been often used conventionally as "contact plugs", "interconnection", or "diffusion barrier layers under the interconnection" of functional electronic devices such as semiconductor components. A compound of tungsten is also frequently used for the diffusion barrier layer.

The formation of a layer formed from this kind of metallic tungsten or a compound thereof has often been performed conventionally based on Chemical Vapor Deposition (CVD) which uses a precursor compound of a gas phase containing a tungsten element. Moreover, pursuant to the higher integration and higher densification of devices in recent years, the narrowing of pitches of the wire forming part and the stretching of deep parts of the contact plug are also advancing, and it tends to form the tungsten layer on a concave part with a high aspect ratio. In order to uniformly form a tungsten layer inclusive of the side wall of the concave part with a high aspect ratio, also adopted is a technique of foremost uniformly forming a W seed layer in the concave part via Atomic Layer Deposition (ALD), and subsequently forming a thick tungsten layer via CVD described above or via plating.

Upon forming a layer formed from tungsten or a compound thereof via CVD or ALD, tungsten hexafluoride ($WF_6$) has been often used conventionally as the precursor compound (refer to Patent Document 1 and the like). Nevertheless, with processes using $WF_6$, there are problems in that the fluorine (F) remaining in trace amounts in the film causes the electro migration of the apparatus, and a part of the apparatus becomes corroded by the highly corrosive fluorine gas ($F_2$) that is generated due to the decomposition of the precursor.

As a means for resolving the foregoing problems, the use of tungsten chloride, which is a compound of chlorine (Cl) having a lower reactivity than fluorine, and tungsten, is being considered. Tungsten chloride has a plurality of different compound forms such as tungsten hexachloride (tungsten chloride (VI): $WCl_6$), tungsten pentachloride (tungsten chloride (V): $WCl_5$), tungsten tetrachloride (tungsten chloride (IV): $WCl_4$), and tungsten dichloride (tungsten chloride (II): $WCl_2$) depending on the difference in the valence of tungsten.

Among the above, $WCl_5$ has a high vapor pressure in comparison to $WCl_6$ and the like, yields superior film thickness uniformity (step coverage) when used as a precursor upon depositing a film on a high aspect ratio part, is also characterized in that etching of the substrate does not occur easily (refer to Patent Document 2 and the like), and is a compound material that is particularly suitable as a precursor material for use in CVD or ALD.

Moreover, $WCl_5$ is also characterized in that it is soluble in many solvents among the tungsten chlorides, and is extremely useful as a catalyst upon synthesizing functional chemicals and as a raw material upon synthesizing other tungsten compounds. As described above, $WCl_5$ as a pentavalent tungsten chloride is a compound that is becoming more important for use as electronic materials, use as chemical synthetic catalysts, and use as compound raw materials, it goes without saying that it would be desirable to efficiently obtain a high purity compound in all of the foregoing uses.

Conventionally, $WCl_5$ is often obtained by subjecting $WCl_6$ to hydrogen reduction at a moderate level as disclosed in Non-Patent Document 1. Moreover, Non-Patent Document 2 discloses a means for obtaining $(WCl_4)_x$ in crystalline form by using Bi, Hg, Sb or the like as the reducing agent and reducing $WCl_6$ under reduced pressure.

CITATION LIST

Patent Documents

[Patent Document 1] Japanese Unexamined Patent Application Publication No. 2015-193908
[Patent Document 2] Japanese Unexamined Patent Application Publication No. 2015-221940

Non-Patent Documents

[Non-Patent Document 1] Takashi Takuma, Seiichiro Kawakubo, Journal of the Chemical Society of Japan, 1972, No. 5, pp. 865-873
[Non-Patent Document 2] V. Kolesnichenko et al., Inorg. Chem., Vol. 37, No. 13 (1998), pp. 3257-3262

SUMMARY

Nevertheless, with the conventional hydrogen reduction method, there are problems in that the reduction efficiency is low and much reaction time is required, and it is difficult to control the hydrogen flow rate and the temperature. Moreover, in case that the system is scaled up for mass production, there are problems in that nonuniformity of the degree of reduction will partially arise, and residue of $WCl_6$, and products such as $WCl_4$, $WCl_2$, and W other than the intended $WCl_5$, are generated in an amount exceeding the tolerated level.

Moreover, with the means of using Bi, Hg, Sb or the like as the reducing agent and reducing $WCl_6$ under reduced pressure, the reaction product of the reducing agent and $WCl_6$ becomes sublimated during reduction unless the process and conditions are properly set, and there is a problem in that the reaction stops midway and a large amount of the reducing agent will remain in the raw material. Furthermore, the yield of $WCl_5$ (raw material yield rate) that is obtained relative to the used $WCl_6$ raw material will only be 50% or less, and there is a problem in that the production yield in light of the purity, the yield and reaction time of the ultimately obtained $WCl_5$ are not necessarily at the level that is expected in comparison to conventional technologies.

In light of the conventional problems described above, an object of the present invention is to provide high purity $WCl_5$, $WCl_5$ containing a dopant element in a moderate amount from a different perspective, and a method of obtaining such $WCl_5$ at a high yield and in an efficient manner.

As a result of intense study, the present inventors discovered that high purity $WCl_5$ can be obtained at a high yield and in a highly efficient manner by controlling the pressure and temperature range in a method of obtaining $WCl_5$ by using a reducing agent and reducing $WCl_6$ while maintaining a state in which a chloride of a reducing agent and W becomes a liquid phase, subsequently performing reduction, and thereafter additionally performing reduced-pressure distillation and sublimation purification, and thereby completed the present invention.

Based on the foregoing discovery, the present invention provides the following invention.

1) Tungsten pentachloride, wherein a total content of metal impurities excluding Sb, Ti, and As is less than 10 wtppm.

2) The tungsten pentachloride according to 1) above, wherein a content of Mo is 2.0 wtppm or less.

3) The tungsten pentachloride according to 1) or 2) above, wherein a total content of one or more elements selected from Sb, Ti, and As falls within a range of 0.01 wtppm or more and 200000 wtppm or less.

4) The tungsten pentachloride according to any one of 1) to 3) above, wherein a content of any one of elements among Sb, Ti, and As falls within a range of either 0.01 wtppm or more and less than 1 wtppm, or 500 wtppm or more and 200000 wtppm or less.

5) The tungsten pentachloride according to any one of 1) to 4) above, wherein a total content of tungsten dichloride, tungsten hexachloride, tungsten tetrachloride, and tungsten acid chloride is 5 wt % or less.

6) A method of producing tungsten pentachloride, comprising the steps of:

uniformly mixing one or more types of reducing agents selected from Sb, Ti, and As and tungsten hexachloride at a molar ratio of 1.0:2.0 to 1.0:5.0 (reducing agent/$WCl_6$ ratio) in an inert atmosphere to obtain a mixture;

heating and reducing the mixture for 1 to 100 hours in a temperature range in which a chloride of tungsten and the reducing agent becomes a liquid phase to obtain a reduced product;

heating the reduced product for 1 to 100 hours at 100 Pa or less and in a temperature range of 90 to 130° C., and performing reduced-pressure distillation thereto to obtain a reduced-pressure distilled product; and heating and sublimating the reduced-pressure distilled product for 1 to 100 hours at 100 Pa or less and in a temperature range of 130 to 170° C., and performing sublimation purification of achieving precipitation at 70 to 120° C. to obtain tungsten pentachloride.

7) The production method of tungsten pentachloride according to 6) above, wherein a grain size of raw materials upon reduction is 200 μm or less.

8) The production method of tungsten pentachloride according to 6) or 7) above, wherein Ti is used as the reducing agent.

9) The production method of tungsten pentachloride according to any one of 6) to 8) above, wherein a pressure and a temperature in which a chloride of tungsten and the reducing agent becomes a liquid phase are 0.1 to 2 MPa and 70 to 130° C., respectively.

10) The production method of tungsten pentachloride according to any one of 6) to 9) above, wherein reduction is performed in a dry nitrogen flow atmosphere having a moisture content of 10 wtppm or less.

11) The production method of tungsten pentachloride according to any one of 6) to 10) above, wherein a yield of tungsten pentachloride is 65% or higher.

According to the present invention, it is possible to obtain $WCl_5$, which can be used as a material for electronic devices such as semiconductor components, chemical synthetic catalysts and compound raw materials, as a high purity product which not only has a low impurity element content but which also has a low content of tungsten chloride having a different valence such as $WCl_6$ and $WCl_4$ other than $WCl_5$. Moreover, since it is possible to obtain this kind of high purity $WCl_5$ at a higher yield and higher efficiency in comparison to conventional technologies, it is possible to improve the production yield and reduce the production cost.

BRIEF DESCRIPTION OF DRAWINGS

FIG. 1 is a diagram showing configuration examples of apparatuses for working the present invention.

DESCRIPTION OF EMBODIMENTS $WCl_5$ of the present invention is characterized in that it is a high purity product in which the total content of metal impurities excluding Sb, Ti, and As is less than 10 wtppm. These metal impurities also get mixed in as impurities in the wiring material when forming the wiring of electronic devices, and are preferably eliminated because they cause the increase of resistivity, generation of electro migration, and diffusion into the device, which leads to the deterioration in the performance and life of the device, and in certain cases leads to the malfunction of the device.

The content of metal impurities excluding Sb, Ti, and As described above is preferably less than 8 wtppm, and more preferably less than 3 wtppm. Among the above, the content of Mo is preferably 2 wtppm or less, and more preferably 1.5 wtppm or less. Note that "wtppm" which represents the unit of the content of trace elements in the present invention indicates the value of the weight basis.

Here, the metal impurities in the present invention refer to the respective elements of Ag, Na, Cd, Co, Fe, In, Mn, Ni, Pb, Zn, Cu, Cr, Ti, Tl, Li, Be, Mg, Al, K, Ga, Ge, As, Sr, Sn, Sb, Ba, Mo, U, and Th, and the contents thereof basically refer to the values analyzed based on Inductively Coupled Plasma Mass Spectrometry (ICP-MS). In the present invention, with regard to elements in which the value detected based on the foregoing analysis is less than the detection lower limit, it is deemed that the content of those elements is zero and such elements are not substantially included.

Among the foregoing impurities elements, the respective elements of Sb, Ti, and As are elements that may be used as a reducing agent upon producing $WCl_5$ as described later, and when these elements are used as a reducing agent, they will indicate a highly significant content in comparison to other metal elements. In this way, when a significantly high content is detected beyond the detection lower limit, the accurate content is analyzed once again based on Inductively Coupled Plasma Optical Emission Spectrometry (ICP-OES), and this will be used as the content of Sb, Ti, and As in the present invention.

Moreover, $WCl_5$ of the present invention may contain a total content of one or more elements selected from Sb, Ti, and As within a range of 0.01 wtppm or more and less than 200000 wtppm. Among the above, when a moderate amount of Sb or As is included, this $WCl_5$ can form element containing V group (5B group) element acting as a dopant contributing to control of the electrical properties depending on the mode of use, and, when a moderate amount of Ti is included, it is possible to yield the effect of improving the barrier properties and adhesiveness when used for the deposition of a diffusion barrier layer in semiconductor apparatuses.

From the foregoing perspective, the content of Sb, Ti, and As as a dopant is preferably 0.01 wtppm or more when used as a low concentration dopant, and may also be 0.05 wtppm or more or 0.1 wtppm or more depending on the mode. When used as a low concentration dopant, the content of these elements is preferably less than 1 wtppm, and may also be 0.8 wtppm or less or 0.5 wtppm or less depending on the mode. When used as a high concentration dopant, the content of these elements is preferably 500 wtppm or more, and may also be 1000 wtppm or more, 3000 wtppm or more, or 5000 wtppm or more depending on the mode. When used as a high concentration dopant, the content of these elements is preferably 200000 wtppm or less, and may also be 150000 wtppm or less or 100000 wtppm or less depending on the mode.

More specifically, the content of Sb is preferably 500 wtppm or more, and may also be 1000 wtppm or more, 3000 wtppm or more, or 5000 wtppm or more depending on the mode. Moreover, when the amount of Sb is excessively great, since it may not be possible to sufficiently exhibit the properties of the intended dopant film, the amount of Sb may be 20000 wtppm or less, and may also be 15000 wtppm or less, 10000 wtppm or less, or 8000 wtppm or less depending on the mode.

Similarly, the content of Ti may be 0.1 wtppm or more, 0.4 wtppm or more, or 0.8 wtppm or more depending on the mode, and the upper limit may be 100000 wtppm or less, and may also be 50000 wtppm or less, or 35000 wtppm or less depending on the mode, and, when a low Ti content is preferable, the content of Ti may be 20 wtppm or less, 10 wtppm or less, and even 1 wtppm or less.

The content of As may be 1000 wtppm or more, 5000 wtppm or more, or 10000 wtppm or more depending on the mode, and the upper limit may be 50000 wtppm or less, and may also be 20000 wtppm or less, or 14000 wtppm or less depending on the mode.

In the present invention, while tungsten chlorides having a different valence such as $WCl_6$, $WCl_2$, and $WCl_4$ other than $WCl_5$, and W-O-Cl-based acid chloride are compound impurities that are not detected as the element impurities described above, it is also preferable to decrease these compound impurities having a different valence. $WCl_5$ of the present invention is characterized in that the total content of $WCl_6$, $WCl_2$, $WCl_4$, and W-O-Cl-based acid chloride is 5 wt% or less. Note that, in the present invention, the content of $WCl_6$, $WCl_2$, $WCl_4$, and W-O-Cl-based acid chloride is a value obtained by quantifying the weight variation via measurement based on thermogravimetry (TG).

While there is no particular limitation in the means for obtaining the foregoing $WCl_5$, as described in detail below, when the method of using one or more types of elements selected from Sb, Ti, and As as a reducing agent and reducing $WCl_6$ under specific conditions, and subsequently performing reduced-pressure distillation and sublimation purification, is adopted, since it is possible to obtain high purity $WCl_5$ at a high yield and in a highly efficient manner, this kind of method can be illustrated as the preferred production method.

With the method described above, foremost, a process of uniformly mixing one or more types of reducing agents selected from Sb, Ti, and As and $WCl_6$ at a molar ratio of 1.0:2.0 to 1.0:5.0 in an inert atmosphere to obtain a mixture is performed. When the amount of the reducing agent is great in excess of 1.0:2.0, a large amount of the reducing agent will remain, and much time will be required for the subsequent reduced-pressure distillation and sublimation purification. When the amount of $WCl_6$ is great in excess of 1.0:5.0, this may lead to a large amount of unreduced $WCl_6$ remaining in the product. The mixing ratio of the reducing agent and $WCl_6$ is more preferably 1.0:3.0 to 1.0:4.0, and a molar ratio that matches the metal valence of the product (1.0:3.0 in the case of Sb and As, and 1.0:4.0 in the case of Ti) is the most preferable.

In the process described above, it is possible to use one or more elements selected from Sb, Ti, and As which yield the effect of reducing $WCl_6$ as a reducing agent. Moreover, with the reducing agent and $WCl_6$ as the raw material to be mixed with the reducing agent, high purity materials are preferably used for both, and, for instance, materials having a purity of 4N or higher may be preferably used. As a result of using a high purity raw material, it is possible to lower the melting point and promote the reaction.

There is no particular limitation in the method of mixing the reducing agent and $WCl_6$ as long as the method is able to uniformly mix to generate a reduction reaction in the proper amount sufficiently; the mixing may be performed using a ball mill, a jet mill, an agitation mixer, a mortar or the like. Here, when performing the mixing, it is important to prevent the oxidation of the raw material and the reducing agent, and perform the mixing in an inert atmosphere in order to prevent the inclusion of oxygen impurities. As the inert atmosphere, argon (Ar), helium (He) and other rare gases, nitrogen ($N_2$) and the like which do not react with the raw material and the reducing agent in a normal temperature may be used.

The mixture obtained by uniformly mixing the reducing agent and the raw material is subject to the following reduction process, and at this stage the grain size of the raw material is preferably at least 200 μm or less, and the grain size of the overall raw material mixture including the reducing agent is preferably 200 μm or less. As a result of reducing the grain size of the raw material as described above, it is possible to increase the reactivity and efficiently promote the reaction, and thereby prevent the residue of unreduced products. In order to cause the grain size of the raw material, or the grain size of the mixture of the reducing agent and the raw material, to fall within the foregoing range, in addition to preparing materials having a grain size of 200 μm or less at the stage before the mixture, the mixing performed by the various mills and mortar described above may also double as the pulverization of such materials. The grain size is preferably 200 μm or less, and may also be 150 μm or less depending on the mode. Note that the term "grain size" as used in the present invention refers to the diameter D90 which becomes 90% of the overall mass in the grain size distribution.

Next, the mixture of the reducing agent and the raw material obtained from the foregoing process is heated and reduced to obtain a reduced product. In this process, while the reducing agent reacts with the chlorine contained in the raw material and forms a chloride of the reducing agent element, what is important here is that the foregoing reduction process is performed while controlling and maintaining the pressure and temperature range in which the chloride of the reducing agent element will be a liquid phase. As a result of performing the reduction process under the foregoing conditions, it is possible to prevent the chloride of the reducing agent element, which is formed based on the reaction, from excessively becoming sublimated and causing the reaction to stop midway, and consequently prevent the reducing agent from remaining in a large amount, and considerably deteriorating the yield of $WCl_5$.

The scope of rough standard of pressure and temperature during reduction differs depending on the type of reducing agent. When Sb is used as the reducing agent, while $SbCl_3$ as the chloride of Sb can maintain a liquid phase state by controlling the pressure to be 0.1 to 2 MPa and the temperature to be 70 to 100° C., the temperature is preferably 72 to 80° C. to stably promote the reduction reaction. Similarly, when Ti is used as the reducing agent, the chloride of the reducing agent element preferably reduces maintaining a liquid phase state by controlling the pressure to be 0.1 to 2 MPa and temperature to be 100 to 130° C., and when As is used as the reducing agent, the chloride of the reducing agent element preferably reduces maintaining a liquid phase state by controlling the pressure to be 0.1 to 100 MPa and temperature to be −16 to 60° C.

By performing the reduction reaction within the foregoing range, it is possible to stop the react at the point in time that $WCl_5$ is synthesized prior to the synthesis of a more stable $WCl_4$. The reduction reaction is preferably performed in a dry nitrogen flow atmosphere having a moisture content of 10 wtppm or less. Moreover, it depends on the amount of the raw material and the amount of the reaction product, the foregoing reduction reaction is preferably performed for 1 hour or longer for sufficient reaction, and may be performed for 10 hours or longer. Since the prolonged performance of the reduction reaction beyond necessity is undesirable in terms of production efficiency, the reduction reaction should be stopped at 100 hours, or at 50 hours depending on the mode.

Next, the reduced product obtained with the foregoing process is subject to reduced-pressure distillation to obtain a reduced-pressure distilled product. In this process, the impurities contained in the reduced product are distilled under a reduced pressure of 100 Pa or less, preferably 50 Pa or less, to mainly eliminate impurities such as $SbCl_3$, $WOCl_4$, and $WO_2Cl_2$ having a lower sublimation point than the target $WCl_5$. The heating temperature during distillation is set to a range of 90 to 130° C., and distillation is performed for 1 hour or longer, preferably for 10 to 100 hours.

Furthermore, the reduced-pressure distilled product obtained with the foregoing process is subject to sublimation purification to obtain a high purity $WCl_5$ product. In this process, the area where the reduced-pressure distilled product is to be sublimated is heated in a temperature range of 130 to 170° C. and the area where $WCl_5$ is to be reprecipitated is set to a temperature range of 70 to 120° C. in an inert atmosphere of 100 Pa or less, preferably 50 Pa or less, to recover high purity $WCl_5$. Sublimation purification is performed for 1 hour or longer, preferably for 10 to 100 hours. Consequently, high purity $WCl_5$ is generated at the precipitated part based on sublimation reprecipitation on the one hand, and impurities such as $WCl_4$ and oxides of the reducing agent element having a higher sublimation point than $WCl_5$ will remain at the heated part on the other hand. Here, the recovered $WCl_5$ may repeatedly be subject to similar sublimation purification, and it is thereby possible to obtain high purity $WCl_5$.

The configuration of apparatuses that are suitable for performing the foregoing processes of the present invention is illustrated in FIG. 1. In all modes of FIG. 1(a) to FIG. 1(c), a processing object 101 is heated within a heating vessel 102. In the reduction process, the processing object 101 is a mixture of $WCl_6$ and a reducing agent, and heated in the heating vessel 102 so that the chloride of the reducing agent becomes a liquid phase state. In the subsequent reduced-pressure distillation process, pressure is reduced in the heating vessel 102, and the processing object 101, which became a reduced product in the reduction process, is heated, but a sublimated product having a lower sublimation point than the generated $WCl_5$ is cooled and collected by a cold trap 103. Subsequently, in the modes of FIG. 1(a) and FIG. 1(b), the cold trap 103 is replaced and the precipitation temperature is set, and the sublimation temperature of the heating vessel 102 is set and sublimation purification is performed. Refined $WCl_5$ thereby becomes precipitated in the cold trap 103.

Meanwhile, in the mode of FIG. 1(c), the heating vessel 102 is configured as a furnace in which the temperature gradient can be set in the horizontal axis direction thereof, and, by setting a sublimated part 111 to the sublimation temperature and setting a precipitated part 112 to the precipitation temperature, respectively, sublimation purification can be performed in the heating vessel 102. Note that the foregoing apparatus configurations merely illustrate examples that can be applied upon actually working the present invention, and it goes without saying that configurations modified as needed and other arbitrary configurations capable of working the present invention may also be adopted.

According to the method of the present invention, in addition to being able to improve the yield of $WCl_5$, which had stopped at 50% or less in conventional technologies, to roughly 65 to 80%, in the reduction process the chloride of the reducing agent element will not cause the reaction to stop because it will not become sublimated , and it is thereby possible to efficiently obtain high purity $WCl_5$. Note that the expression "yield of $WCl_5$" as used in the present invention refers to the numerical value which expresses, as a percentage, the mass of $WCl_5$ actually recovered from precipitates based on sublimation purification relative to the mass of $3WCl_5$ or $4WCl_5$ which is theoretically anticipated based on the reaction of following Formulas (1) to (3) concerning $WCl_6$ (raw material) and the reducing agent, i.e. ((actually recovered mass of $WCl_5$/theoretically recovered mass of $WCl_5$)×100(%)).

$$3WCl_6 + Sb \rightarrow WCl_5 + SbCl_3 \quad (1)$$

$$4WCl_6 + Ti \rightarrow 4WCl_5 + TiCl_4 \quad (2)$$

$$3WCl_6 + As \rightarrow 3WCl_6 + AsCl_3 \quad (3)$$

EXAMPLES

The present invention is now explained in detail with reference to the Examples and Comparative Examples. Descriptions of the ensuing Examples and Comparative Examples are merely specific examples for facilitating the understanding of the technical contents of the present invention, and the technical scope of the present invention is not limited by such specific examples.

Example 1

$WCl_6$ having a purity of 4N and Sb having a purity of 5N as a reducing agent were uniformly mixed with a mortar in a nitrogen atmosphere to achieve a total mass of 1 kg at a molar ratio of 3:1. Next, the obtained mixture was placed in a vacuum vessel and heated at 150° C. for 24 hours to reduce $WCl_6$ while maintaining the ambient pressure in the vessel to be an atmospheric pressure (approximately 0.1 MPa). During this reduction operation based on heating, $SbCl_3$, chloride of Sb as the reducing agent, was subject to the condition of maintaining a liquid phase state.

Subsequently, impurities were eliminated by subjecting the reduced product obtained with the foregoing reduction operation to reduced-pressure distillation through sublimation by being heated at 100° C. for 24 hours while maintaining the ambient pressure in the vacuum vessel at 50 Pa. Furthermore, the obtained reduced-pressure distilled product was sublimated by being placed at a heated part having an atmospheric pressure of 50 Pa and being heated at 150° C., and sublimation purification was consequently performed by precipitating the product at a precipitated part of 90° C. The sublimation purification time was 24 hours. Subsequently, the obtained W015 was recovered in a nitrogen atmosphere and sealed in an ampule.

Results of performing trace element analysis to the recovered $WCl_5$ are shown in Table 1. As impurities excluding Sb that was used as the reducing agent, Fe and Mo were detected in excess of the detection lower limit, the total content thereof was 9.1 wtppm. Moreover, the content of Sb was 6000 wtppm. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 1 wt %, and 3 wt %, and the total content was 4 wt %. In addition, a value of 78% was obtained as the yield of $WCl_5$ in this Example, and the achievement of a high yield was possible by using Sb as the reducing agent.

TABLE 1

| | | Example 1 | Example 2 | Example 3 | Example 4 | Example 5 | Example 6 | Example 7 |
|---|---|---|---|---|---|---|---|---|
| Metal Impurity (wtppm) | Ag | <0.1 | <0.1 | <0.1 | <0.1 | <0.1 | <0.1 | <0.1 |
| | Na | <1 | <1 | <1 | <1 | <1 | <1 | <1 |
| | Cd | <1 | <1 | <1 | <1 | <1 | <1 | <1 |
| | Co | <0.1 | <0.1 | <0.1 | <0.1 | <0.1 | <0.1 | <0.1 |
| | Fe | 1.8 | <1 | <1 | 2.6 | <1 | <1 | <1 |
| | In | <0.1 | <0.1 | <0.1 | <0.1 | <0.1 | <0.1 | <0.1 |
| | Mn | <0.1 | <0.1 | <0.1 | <0.1 | <0.1 | <0.1 | <0.1 |
| | Ni | <1 | <1 | <1 | <1 | <1 | <1 | <1 |
| | Pb | <0.1 | <0.1 | <0.1 | <0.1 | <0.1 | <0.1 | <0.1 |
| | Zn | <1 | <1 | <1 | <1 | <1 | <1 | <1 |
| | Cu | <1 | <1 | <1 | <1 | <1 | <1 | <1 |
| | Cr | <1 | <1 | <1 | <1 | <1 | <1 | <1 |
| | Ti | <1 | 0.9 | 32000 | <1 | <1 | 2900 | 0.2 |
| | Tl | <0.1 | <0.1 | <0.1 | <0.1 | <0.1 | <0.1 | <0.1 |
| | Li | <0.1 | <0.1 | <0.1 | <0.1 | <0.1 | <0.1 | <0.1 |
| | Be | <0.1 | <0.1 | <0.1 | <0.1 | <0.1 | <0.1 | <0.1 |
| | Mg | <0.1 | <0.1 | <0.1 | <0.1 | <0.1 | <0.1 | <0.1 |
| | Al | <0.1 | <0.1 | <0.1 | <0.1 | <0.1 | <0.1 | <0.1 |
| | K | 6 | 2 | 2 | 4 | 5 | 2 | 2 |
| | Ga | <0.1 | <0.1 | <0.1 | <0.1 | <0.1 | <0.1 | <0.1 |
| | Ge | <0.2 | <0.2 | <0.2 | <0.2 | <0.2 | <0.2 | <0.2 |
| | As | <0.5 | <0.5 | <0.5 | 12000 | <0.5 | <0.5 | <0.5 |
| | Sr | <0.1 | <0.1 | <0.1 | <0.1 | <0.1 | <0.1 | <0.1 |
| | Sn | <0.1 | <0.1 | <0.1 | <0.1 | <0.1 | <0.1 | <0.1 |
| | Sb | 6000 | <0.1 | <0.1 | <0.1 | 7000 | <0.1 | <0.1 |
| | Ba | <0.1 | <0.1 | <0.1 | <0.1 | <0.1 | <0.1 | <0.1 |
| | Mo | 1.3 | 0.5 | 0.5 | 1.2 | 1.4 | 1.5 | 0.5 |
| | U | <0.1 | <0.1 | <0.1 | <0.1 | <0.1 | <0.1 | <0.1 |
| | Th | <0.1 | <0.1 | <0.1 | <0.1 | <0.1 | <0.1 | <0.1 |
| | Total Metal Content (*) | 9.1 | 2.5 | 2.5 | 7.8 | 6.4 | 3.5 | 2.5 |
| Ratio of Metal in Collected Sublimates (wt %) | $WCl_2$ | 0 | 0 | 0 | 0 | 0 | 0 | 0 |
| | $WCl_4$ | 0 | 0 | 0 | 0 | 0 | 0 | 0 |
| | $WCl_5$ | 96 | 99 | 99 | 96 | 20 | 95 | 62 |
| | $WCl_6$ | 1 | 0 | 0 | 1 | 70 | 1 | 30 |
| | W—O—Cl | 3 | 1 | 1 | 3 | 10 | 4 | 8 |
| | $WCl_5$ (g) | 780 | 660 | 650 | 690 | 120 | 190 | 80 |
| | Yield (%) | 78 | 66 | 65 | 69 | 12 | 19 | 8 |

| | | Comparative Example 1 | Comparative Example 2 | Comparative Example 3 | Comparative Example 4 | Comparative Example 5 | Comparative Example 6 |
|---|---|---|---|---|---|---|---|
| Metal Impurity (wtppm) | Ag | — | <0.1 | <0.1 | <0.1 | <0.1 | <0.1 |
| | Na | — | <1 | 3.8 | 3.5 | 4.1 | 2.5 |
| | Cd | — | <1 | <1 | <1 | <1 | <1 |
| | Co | — | <0.1 | <0.1 | <0.1 | <0.1 | <0.1 |
| | Fe | — | 5.9 | 8.1 | 6.5 | 7.8 | 2.3 |
| | In | — | <0.1 | <0.1 | <0.1 | <0.1 | <0.1 |
| | Mn | — | <0.1 | <0.1 | <0.1 | <0.1 | <0.1 |
| | Ni | — | <1 | <1 | <1 | <1 | <1 |
| | Pb | — | <0.1 | <0.1 | <0.1 | <0.1 | <0.1 |
| | Zn | — | <1 | <1 | <1 | <1 | <1 |
| | Cu | — | <1 | <1 | <1 | <1 | <1 |
| | Cr | — | <1 | <1 | <1 | <1 | <1 |
| | Ti | — | <1 | <1 | <1 | 31000 | 11000 |
| | Tl | — | <0.1 | <0.1 | <0.1 | <0.1 | <0.1 |
| | Li | — | <0.1 | <0.1 | <0. | <0.1 | <0.1 |
| | Be | — | <0.1 | <0.1 | <0.1 | <0.1 | <0.1 |
| | Mg | — | <0.1 | <0.1 | <0.1 | <0.1 | <0.1 |
| | Al | — | <0.1 | <0.1 | <0.1 | <0.1 | <0.1 |
| | K | — | 12 | 24 | 13 | 23 | 18 |

TABLE 1-continued

| | | | | | | | |
|---|---|---|---|---|---|---|---|
| | Ga | — | <0.1 | <0.1 | <0.1 | <0.1 | <0.1 |
| | Ge | — | <0.2 | <0.2 | <0.2 | <0.2 | <0.2 |
| | As | — | <0.5 | <0.5 | <0.5 | <0.5 | <0.5 |
| | Sr | — | <0.1 | <0.1 | <0.1 | <0.1 | <0.1 |
| | Sn | — | <0.1 | <0.1 | <0.1 | <0.1 | <0.1 |
| | Sb | — | <0.1 | 29000 | 19000 | <0.1 | <0.1 |
| | Ba | — | <0.1 | <0.1 | <0.1 | <0.1 | <0.1 |
| | Mo | — | 2.1 | 1.9 | 1.2 | 1.9 | 1.8 |
| | U | — | <0.1 | <0.1 | <0.1 | <0.1 | <0.1 |
| | Th | — | <0.1 | <0.1 | <0.1 | <0.1 | <0.1 |
| | Total Metal Content (*) | — | 20.0 | 37.8 | 24.2 | 36.8 | 24.6 |
| Ratio of Metal in Collected Sublimates (wt %) | $WCl_2$ | — | 0 | — | 0 | — | 0 |
| | $WCl_4$ | — | 0 | — | 0 | — | 0 |
| | $WCl_5$ | — | 81 | — | 80 | — | 85 |
| | $WCl_6$ | — | 15 | — | 10 | — | 8 |
| | W—O—Cl | — | 4 | — | 10 | — | 7 |
| | $WCl_5$ (g) | — | 30 | — | 340 | — | 580 |
| | Yield (%) | — | 3 | — | 34 | — | 58 |

(*): Excluding elements Sb, Ti and As used as reducing agents

Example 2

$WCl_6$ having a purity of 4N and Ti having a purity of 5N as a reducing agent were uniformly mixed with a mortar in a nitrogen atmosphere to achieve a total mass of 1 kg at a molar ratio of 4:1. Next, the obtained mixture was placed in a vacuum vessel and heated at 130° C. for 24 hours to reduce $WCl_6$ while maintaining the ambient pressure in the vessel to be an atmospheric pressure (approximately 0.1 MPa). During this reduction operation based on heating, $TiCl_4$, which is chloride of Ti as the reducing agent, was subject to the condition of maintaining a liquid phase state. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding Ti that was used as the reducing agent, K and Mo were detected in excess of the detection lower limit, the total content thereof was slightly 2.5 wtppm. Moreover, it was possible to suppress the content of Ti to a trace amount of 0.9 wtppm. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 0 wt %, and 1 wt %, and it was possible to effectively reduce the total impurity content by using a moderate amount of Ti as the reducing agent. In addition, a value of 66% was obtained as the yield of $WCl_5$ in this Example.

Example 3

$WCl_6$ having a purity of 4N and Ti having a purity of 5N as a reducing agent were uniformly mixed with a mortar in a nitrogen atmosphere to achieve a total mass of 1 kg at a molar ratio of 3:1 in which Ti becomes surplus. Next, the obtained mixture was placed in a vacuum vessel and heated at 130° C. for 24 hours to reduce $WCl_6$ while maintaining the ambient pressure in the vessel to be an atmospheric pressure (approximately 0.1 MPa). During this reduction operation based on heating, $TiCl_4$, which is chloride of Ti as the reducing agent, was subject to the condition of maintaining a liquid phase state. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding Ti that was used as the reducing agent, K and Mo were detected in excess of the detection lower limit, the total content thereof was slightly 2.5 wtppm as with Example 2. Nevertheless, in this Example in which Ti as the reducing agent becomes surplus in comparison to Example 2, residue of Ti in an amount of 32000 wtppm was acknowledged. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 0 wt %, and 1 wt %, and it was possible to effectively reduce metal impurities and compound impurities other than the reducing agent even under a molar ratio condition in which the reducing agent becomes surplus. In addition, a value of 65% was obtained as the yield of $WCl_5$ in this Example.

Example 4

$WCl_6$ having a purity of 4N and As having a purity of 5N as a reducing agent were uniformly mixed with a mortar in a nitrogen atmosphere to achieve a total mass of 1 kg at a molar ratio of 3:1. Next, the obtained mixture was placed in a vacuum vessel and heated at 120° C. for 24 hours to reduce $WCl_6$ while maintaining the ambient pressure in the vessel to be an atmospheric pressure (approximately 0.1 MPa). During this reduction operation based on heating, $AsCl_3$, which is chloride of As as the reducing agent, was subject to the condition of maintaining a liquid phase state. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding As that was used as the reducing agent, Fe, K and Mo were detected in excess of the detection lower limit, the total content thereof was 7.8 wtppm. Moreover, the content of As was 12000 wtppm. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 1 wt %, and 3 wt %, and the total content was 4 wt %. In addition, a value of 69% was obtained as the yield of $WC_5$ in this Example.

Example 5

$WCl_6$ having a purity of 4N and Sb having a purity of 5N as a reducing agent were uniformly mixed with a mortar in a nitrogen atmosphere to achieve a total mass of 1 kg at a molar ratio of 3:1. Next, the obtained mixture was placed in a vacuum vessel and heated at 60° C. for 24 hours to reduce $WCl_6$ while maintaining the ambient pressure in the vessel to be an atmospheric pressure (approximately 0.1 MPa). In this Example, since the temperature during this reduction operation was low, $SbCl_3$, which is chloride of Sb as the reducing agent, was in a solid phase state without becoming a liquid phase state. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding Sb that was used as the reducing agent, K and Mo were detected in excess of the detection lower limit, the total content thereof was 6.4 wtppm. Nevertheless, in this Example in which the temperature during reduction is of a lower condition than Example 1, residue of Sb in an amount of 7000 wtppm was acknowledged. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 70 wt %, and 10 wt %, and the yield of $WCl_5$ was 12%. When the chloride of the reducing agent remains in a solid phase, while this is effective in reducing metal impurities other than the reducing agent, a large amount of $WCl_6$ will remain, and the yield will deteriorate considerably.

Example 6

$WCl_6$ having a purity of 4N and Ti having a purity of 5N as a reducing agent were uniformly mixed with a mortar in a nitrogen atmosphere to achieve a total mass of 1 kg at a molar ratio of 4:1. Next, the obtained mixture was placed in a vacuum vessel and heated at 160° C. for 24 hours to reduce $WCl_6$ while maintaining the ambient pressure in the vessel to be an atmospheric pressure (approximately 0.1 MPa). In this Example, since the temperature during this reduction operation was excessively high, $TiCl_4$, which is chloride of Ti as the reducing agent, became a gas phase state. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding Ti that was used as the reducing agent, K and Mo were detected in excess of the detection lower limit, the total content thereof was 3.5 wtppm. Nevertheless, in this Example in which the temperature during reduction is of a higher condition than Example 2, residue of Ti in an amount of 2900 wtppm was acknowledged. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 1 wt %, and 4 wt %, and the yield of $WCl_5$ was 19%. When the chloride of the reducing agent quickly becomes gasified as with this Example, while this is effective in reducing metal impurities other than the reducing agent, a large amount of $WCl_6$ will remain, and the yield will deteriorate considerably.

Example 7

$WCl_6$ having a purity of 4N and Ti having a purity of 5N as a reducing agent were uniformly mixed with a mortar in a nitrogen atmosphere to achieve a total mass of 1 kg at a molar ratio of 6:1. Next, the obtained mixture was placed in a vacuum vessel and heated at 130° C. for 24 hours to reduce $WCl_6$ while maintaining the ambient pressure in the vessel to be an atmospheric pressure (approximately 0.1 MPa). In this Example, while the chloride of the reducing agent was subject to the condition in which the liquid phase state is maintained during the reduction operation, the amount of the reducing agent has decreased. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities excluding Ti that was used as the reducing agent, K and Mo were detected in excess of the detection lower limit, the total content thereof was slightly 2.5 wtppm. Nevertheless, in this Example in which the amount of the reducing agent is smaller than Example 2, residue of Ti in an amount of 0.2 wtppm was acknowledged. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 30 wt %, and 8 wt %, and the yield of $WCl_5$ was 8%. When the amount of the reducing agent is small, while this is effective in reducing metal impurities other than the reducing agent, a large amount of $WCl_6$ will remain, and the yield will deteriorate considerably.

Comparative Example 1

In the modes which respectively apply bismuth (Bi), mercury (Hg), aluminum (Al), and phosphorus (P) as the reducing agent, thermodynamic simulation was performed and examined. Nevertheless, it was discovered that, with these elements, in reality it is impossible to stably maintain a liquid phase state because the chloride is directly sublimated from a solid phase and becomes a gas phase. Because it became evident that it is difficult to reduce $WCl_6$ in a high purity and at a high yield based on the foregoing result, these elements were only examined regarding their feasibility as a reducing agent.

Comparative Example 2

$WCl_6$ having a purity of 4N was placed in a vacuum vessel to achieve a total mass of 1 kg, the atmosphere in the vessel was caused to be a hydrogen flow based on the reduction method of Non-Patent Document 1, and $WCl_6$ was heated and reduced at 350° C. for 24 hours. Subsequently, the reduced product obtained with the foregoing reduction operation was subject to reduced-pressure distillation, and the thus obtained reduced-pressure distilled product was additionally subject to sublimation purification. The conditions of reduced-pressure distillation and sublimation purification were the same as Example 1. Subsequently, the obtained $WCl_5$ was recovered in a nitrogen atmosphere and sealed in an ampule.

Results of performing trace element analysis to the recovered $WCl_5$ are shown in Table 1. As impurities, Fe, K and Mo were detected in excess of the detection lower limit, and the total content thereof was 20 wtppm, and exceeded 10 wtppm. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 15 wt %, and 4 wt %, and the yield of $WCl_5$ was slightly 3%. The hydrogen reduction method known as a conventional technique ended in an unrealistic result in terms of actual practical application from the perspective of yield and industrial productivity.

Comparative Example 3

$WCl_6$ having a purity of 4N and Sb having a purity of 5N as a reducing agent were uniformly mixed with a mortar in a nitrogen atmosphere to achieve a total mass of 1 kg at a molar ratio of 3:1. Next, the obtained mixture was placed in a vacuum vessel and heated at 150° C. for 24 hours to reduce $WCl_6$ while maintaining the ambient pressure in the vessel to be an atmospheric pressure (approximately 0.1 MPa). During this reduction operation based on heating, $SbCl_3$, which is chloride of Sb as the reducing agent, was subject to the condition of maintaining a liquid phase state. In this Example, the reduced product was directly recovered without undergoing reduced-pressure distillation and sublimation purification.

Results of performing trace element analysis to the recovered reduced product are shown in Table 1. As impurities excluding Sb that was used as the reducing agent, Na, Fe, K and Mo were detected in excess of the detection lower limit, and the total content thereof was 37.8 wtppm, and exceeded 10 wtppm. Moreover, residue of Sb used as the reducing agent in an amount of 29000 wtppm was acknowledged. Furthermore, in this Example, because reduced-pressure distillation and sublimation purification were not performed, various types of compounds other than the intended $WCl_5$ were contained in a large amount in the product. Moreover, because it was not possible to recover the sublimated/purified product, quantitative analysis based on the TG method was impossible. Accordingly, in this Example, it was not possible to ultimately obtain the intended $WCl_5$ of the present invention.

Comparative Example 4

$WCl_6$ having a purity of 4N and Sb having a purity of 5N as a reducing agent were uniformly mixed with a mortar in a nitrogen atmosphere to achieve a total mass of 1 kg at a molar ratio of 3:1. Next, the obtained mixture was placed in a vacuum vessel and heated at 150° C. for 24 hours to reduce $WCl_6$ while maintaining the ambient pressure in the vessel to be an atmospheric pressure (approximately 0.1 MPa). During this reduction operation based on heating, $SbCl_3$, which is chloride of Sb as the reducing agent, was subject to the condition of maintaining a liquid phase state. Subsequently, the reduced product obtained with the foregoing reduction operation was subject to reduced-pressure distillation based on the same conditions as Example 1. In this Example, the obtained reduced-pressure distilled product was recovered without undergoing sublimation purification.

Results of performing trace element analysis to the recovered reduced-pressure distilled product are shown in Table 1. As impurities excluding Sb that was used as the reducing agent, Na, Fe, K and Mo were detected in excess of the detection lower limit, and the total content thereof was 24.2 wtppm, and exceeded 10 wtppm. Moreover, residue of Sb used as the reducing agent in an amount of 19000 wtppm was acknowledged. Furthermore, as a result of performing a quantitative analysis regarding the contents of $WCl_2$, $WCl_4$, $WCl_6$, and W-O-Cl-based acid chloride as compound impurities based on the TG method, the contents were respectively 0 wt %, 0 wt %, 10 wt %, and 10 wt %, and the yield of $WCl_5$ was 34%. Since sublimation purification was not performed in this Example, the amount of the reducing agent and the amount of metal element impurities other than the reducing agent were great, and the yield of $WCl_5$ was also low.

Comparative Example 5

$WCl_6$ having a purity of 4N and Ti having a purity of 5N as a reducing agent were uniformly mixed with a mortar in a nitrogen atmosphere to achieve a total mass of 1 kg at a molar ratio of 4:1. Next, the obtained mixture was placed in a vacuum vessel and heated at 130° C. for 24 hours to reduce $WCl_6$ while maintaining the ambient pressure in the vessel to be an atmospheric pressure (approximately 0.1 MPa). During this reduction operation based on heating, $TiCl_4$, which is chloride of Ti as the reducing agent, was subject to the condition of maintaining a liquid phase state. In this Example, the reduced product was directly recovered without undergoing reduced-pressure distillation and sublimation purification.

Results of performing trace element analysis to the recovered reduced product are shown in Table 1. As impurities excluding Ti that was used as the reducing agent, Na, Fe, K and Mo were detected in excess of the detection lower limit, and the total content thereof was 36.8 wtppm, and exceeded 10 wtppm. Moreover, residue of Ti used as the reducing agent in an amount of 31000 wtppm was acknowledged. Furthermore, in this Example, because reduced-pressure distillation and sublimation purification were not performed, various types of compounds other than the intended $WCl_5$ were contained in a large amount in the product. Moreover, because it was not possible to recover the sublimated/purified product, quantitative analysis based on the TG method was impossible. Accordingly, in this Example, it was not possible to ultimately obtain the intended WCl$_5$ of the present invention.

Comparative Example 6

WCl$_6$ having a purity of 4N and Ti having a purity of 5N as a reducing agent were uniformly mixed with a mortar in a nitrogen atmosphere to achieve a total mass of 1 kg at a molar ratio of 4:1. Next, the obtained mixture was placed in a vacuum vessel and heated at 130° C. for 24 hours to reduce WCl$_6$ while maintaining the ambient pressure in the vessel to be an atmospheric pressure (approximately 0.1 MPa). During this reduction operation based on heating, TiCl$_4$, which is chloride of Ti as the reducing agent, was subject to the condition of maintaining a liquid phase state. Subsequently, the reduced product obtained with the foregoing reduction operation was subject to reduced-pressure distillation based on the same conditions as Example 1. In this Example, the obtained reduced-pressure distilled product was recovered without undergoing sublimation purification.

Results of performing trace element analysis to the recovered reduced-pressure distilled product are shown in Table 1. As impurities excluding Sb that was used as the reducing agent, Na, Fe, K and Mo were detected in excess of the detection lower limit, and the total content thereof was 24.6 wtppm, and exceeded 10 wtppm. Moreover, reside of Ti used as the reducing agent in an amount of 11000 wtppm was acknowledged. Furthermore, as a result of performing a quantitative analysis regarding the contents of WCl$_2$, WCl$_4$, WCl$_6$, and W-O-Cl-based acid chloride as compound impurities based on the TG method, the contents were respectively 0 wt %, 0 wt %, 8 wt %, and 7 wt %, and the yield of WCl$_5$ was 58%. Since sublimation purification was not performed in this Example, the amount of the reducing agent and the amount of metal element impurities other than the reducing agent were great, and the yield was less than 60%.

According to the present invention, high purity tungsten pentachloride and tungsten pentachloride containing a moderate amount of a dopant element can be produced at a high yield and in an efficient manner. Since it is thereby possible to effectively supply tungsten pentachloride materials having a purity level required for use as electronic component materials of semiconductor devices and the like, high purity chemical synthetic catalysts, and compound raw materials etc, the present invention is expected to become a major contributor to the industrial field of semiconductor equipment, electronic materials, and organic synthetic chemistry and so on.

The invention claimed is:

1. Tungsten pentachloride, wherein a total content of metal impurities excluding Sb, Ti, and As is less than 10 wtppm, and wherein a content of is 0.2 wtppm or more and 32000 wtppm or less.

2. The tungsten pentachloride according to claim 1, wherein a content of Mo is 2 wtppm or less.

3. The tungsten pentachloride according to claim 2, wherein a content of any one of elements among Sb and As falls within a range of 0.01 wtppm or more and less than 1 wtppm.

4. The tungsten pentachloride according to claim 1, wherein a content of any one of elements among Sb and As falls within a range of 0.01 wtppm or more and less than 1 wtppm.

5. The tungsten pentachloride according to claim 1, wherein the total content of Sb, Ti, and As falls within a range of greater than 0.9 wtppm to 200000 wtppm.

6. The tungsten pentachloride according to claim 1, wherein a total content of tungsten dichloride, tungsten tetrachloride, tungsten hexachloride, and tungsten acid chloride is 5 wt % or less.

7. Tungsten pentachloride, wherein a total content of metal impurities excluding Sb, Ti and As is less than 10 wtppm, and wherein a content of As is 5000 wtppm or more and 20000 wtppm or less.

\* \* \* \* \*